United States Patent
Jäger

[11] 3,890,376
[45] June 17, 1975

[54] PROCESS FOR THE MANUFACTURE OF PERFLUOROALKYL ESTERS

[75] Inventor: Horst Jäger, Bettingen, Switzerland

[73] Assignee: Ciba-Geigy AG, Basel, Switzerland

[22] Filed: Sept. 10, 1973

[21] Appl. No.: 395,810

[30] Foreign Application Priority Data
Sept. 19, 1972 Switzerland.................... 13678/72
Dec. 21, 1972 Switzerland.................... 18660/72

[52] U.S. Cl........ 260/485 F; 117/138.5; 260/456 P; 260/486 H
[51] Int. Cl... C07c 69/52; C07c 69/54; C07c 69/60
[58] Field of Search......260/485 F, 486 H, 491 US

[56] References Cited
UNITED STATES PATENTS
2,778,850  1/1957  Barr et al. .................... 260/485 F

*Primary Examiner*—Lorraine A. Weinberger
*Assistant Examiner*—E. Jane Skelly
*Attorney, Agent, or Firm*—Joseph G. Kolodny; Edward McC. Roberts; Probodh I. Almaula

[57] ABSTRACT

A new process for the manufacture of perfluoroalkyl esters of the formula

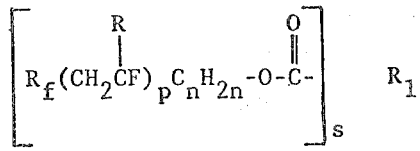

wherein $R_f$ represents perfluoroalkyl radical with 4 to 14 carbon atoms, R represents hydrogen or fluorine, $R_1$ represents an ethyleneically unsaturated hydrocarbon radical of organic monobasic, dibasic, or tribasic carboxylic acids with 3 to 6 carbon atoms, $n$ is a whole number from 1 to 12, $p$ is 0 or a whole number from 1 to 3, and $s$ is a whole number from 1 to 3, is provided. The process is carried out by reacting a perfluoroalkyl nitrate of the formula

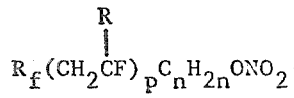

with an organic mono-, do- or tribasic carboxylic acid in the presence of sulphuric acid. The perfluoroalkyl esters are useful as water and oil-repellants.

21 Claims, No Drawings

PROCESS FOR THE MANUFACTURE OF PERFLUOROALKYL ESTERS

This present invention provides a process for the manufacture of perfluoroalkyl esters of the formula

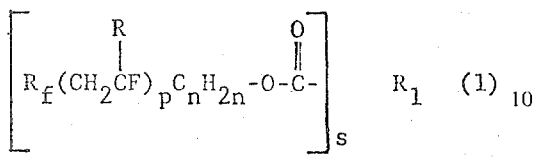   (1)

wherein $R_f$ represents an unbranched or branched perfluoroalkyl radical with 4 to 14 carbon atoms, R represents hydrogen or fluorine, $R_1$ represents an ethylenically unsaturated hydrocarbon radical of organic monobasic, dibasic, or tribasic carboxylic acids with 3 to 6 carbon atoms, $n$ is a whole number from 1 to 12, $p$ is 0 or a whole number from 1 to 3, and $s$ is a whole number from 1 to 3, which process consists in reacting a perfluoroalkyl nitrate of the formula

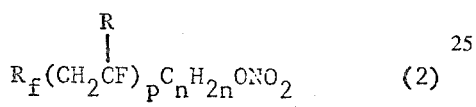   (2)

with an organic carboxylic acid of the formula

$R_1(COOH)_s$   (3)

in the presence of sulphuric acid.

According to a further embodiment of the process, the perfluoroalkyl nitrate is reacted first with sulphuric acid and subsequently with the organic carboxylic acid, optionally after isolation of the intermediate product.

Suitable starting materials for carrying out the process are perfluoroalkyl nitrates of the formula

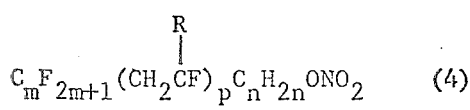   (4)

wherein $m$ is a whole number from 4 to 12, preferably from 4 to 10, $n$ is a whole number from 1 to 12, preferably from 2 to 6, and $p$ is 0 or a whole number from 1 to 3, preferably 0 or 1. A number of these compounds are known e.g. from German Offenlegungsschrift 2.028.459. They are obtained by reaction of the corresponding perfluoroalkyl iodides with nitric acid. It is advantageous to use those perfluoroalkyl nitrates which correspond to the formulae $F(CF_2)_m CH_2CH_2ONO_2$   (5)

and

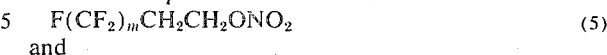   (6)

and to the formulae $F(CF_2)_m(CH_2CF_2)_p/CH_2CH_2ONO_2$   (7)
$F(CF_2)_m(CH_2CHF)_p/CH_2CH_2ONO_2$   (8)

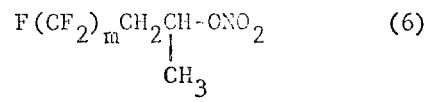   (9)

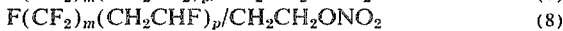   (10)

and wherein m has the indicated meaning and p' is a whole number from 1 to 3, preferably 1. Further perfluoroalkyl nitrates which contain branched perfluoroalkyl radicals correspond, for example, to the formulae

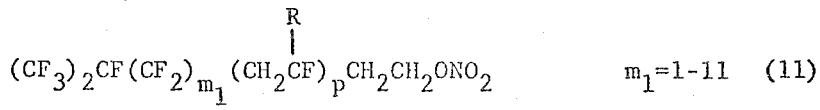   $m_1=1-11$   (11)

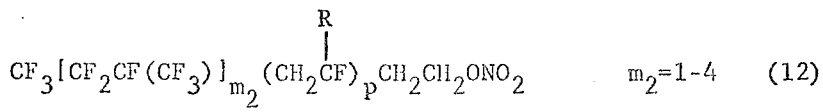   $m_2=1-4$   (12)

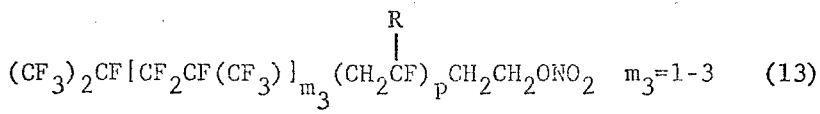   $m_3=1-3$   (13)

wherein R represents hydrogen fluorine and p is 0 or a whole number from 1 to 3, preferably 0 or 1.

The ethylenically unsaturated monobasic, dibasic, or tribasic carboxylic acids used for carrying out the process contain from 3 to 6 carbon atoms. Examples of such acids are: acrylic acid, methacrylic acid, crotonic acid, vinylacetic acid, fumaric acid, maleic acid, methylenemalonic acid, citraconic acid, mesaconic acid, itaconic acid and aconitic acid. The monobasic and dibasic carboxylic acids, such as acrylic, methacrylic, fumaric, and itaconic acid, are preferred. If the process is carried out in two steps, it is also possible to use the salts of the cited acids in the reaction, e.g. alkali, alkaline earth, or ammonium salts.

Preferably the reaction of the perfluoroalkyl nitrates with organic carboxylic acids can take place in a single step or also in two steps and is carried out in an organic solvent, preferably an aromatic solvent, at temperatures from 30° to 150°C.

Examples of suitable solvents are benzene, toluene, and xylene, as well as other benzene compounds or also cycloaliphatic compounds, such as cyclohexane or methylcyclohexane.

In the single step process, for example, the perfluoroalkyl nitrate and the carboxylic acid are dissolved in an aromatic solvent and the solution is treated with concentrated sulphuric acid. The reaction solution is then heated to the boiling temperature of the particular solvent used — this can be about 80° to 150°C - and kept at this temperature for up to 24 hours, preferably 10 to 20 hours.

The concentrated sulphuric acid used is e.g. of 96 to 98 percent strength. The molar ratio of perfluoroalkyl nitrate to the carboxylic acid can be about 2:1 to 1:2, preferably 1:1. The molar ratio perfluoroalkyl nitrate to concentrated sulphuric acid can be about 0.01 to 1:1 mole, the esterification time being shortened with increasing amounts of sulphuric acid. If the esterification is effected at a molar ratio of nitrate:sulphuric acid: carboxylic acid of 1:1:1 there occurs a rapid exothermic reaction already at 50°C and the esterification is terminated within 2 hours.

Upon completion of the reaction the solvents and the by-products, e.g. sulphonated and nitrated solvent derivatives such as benzenesulphonic acid, nitrobenzene, nitrotoluene or toluenesulphonic acid, are isolated, and the perfluoroalkyl esters are obtained by known methods, for example by distillation or crystallisation.

In the two step process, the solution of the perfluoroalkyl nitrate in the organic aromatic solvent is treated first with concentrated sulphuric acid. The molar ratio of perfluoroalkyl nitrate to sulphuric acid can be about (0.01 to 1.1) : 1 and is preferably 1:1.

The reaction with the organic carboxylic acid is then carried out under the cited conditions.

If appropriate, it is also possible to isolate after the first step sulphuric acid diesters of the formula

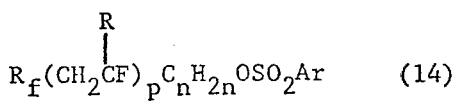

(14)

wherein Ar is the aromatic radical of the solvent and $R_f$, $n$, and $p$ have the indicated meanings. These intermediates are then reacted in the second step with the organic carboxylic acid or with a salt thereof, preferably an alkali, alkaline earth, or ammonium salt, in the presence of small, practically catalytic amounts of sulphuric acid or another acid. Solvents for this second step are also the cited aromatic compounds. Each step of the two-step reaction can take from 2 to 12 hours.

In order to prevent for example a possible polymerisation of the ethylenically unsaturated carboxylic acids during the reaction, it is advisable to add polymerisation inhibitors, for example hydroquinone monomethyl ether, to the reaction mixture.

By means of the process according to the invention it is possible to manufacture the cited esters in good yield from the perfluoroalkyl nitrates, optionally without isolation of intermediate producuts. The process according to the invention constitutes an industrially and chemically simple method of manufacturing valuable perfluoroalkyl esters of unsaturated carboxylic acids. The process illustrates a novel, safe method of esterifying substances which are sensitive to secondary reactions. As monomers and also in polymerised form, these esters constitute valuable finishing agents for rendering the most diverse materials, for example textiles, water and oil repellant.

The following Examples will serve to illustrate the invention, but do not limit its scope in any way. Parts and percentages are by weight.

EXAMPLE 1

150 g (0.34 mole) of perfluoroalkyl ethylnitrate *) and 18 g (0.155 mole) of fumaric acid are dissolved in 450 ml of toluene. Then 0.5 g of hydroquinone monomethyl ether (as polymerisation inhibitor) and 10 ml of concentrated sulphuric acid are added.

The reaction solution is heated to 110°C and kept for 18 hours at this temperature with stirring. The evolution of nitrous gases immediately colors the reaction solution dark brown. The solution is processed by filtering it hot over a glass frit and constituents which are insoluble in toluene, but soluble in water, are isolated therefrom. After the solution has been cooled, 90 g of brown crystals with a melting point of 80°-85°C are isolated. A further 71.3 g of crude product are isolated by distillation of the mother liquor. 161.3 g of combined crude product are then distilled in a high vacuum. Yield: 125.4 g (84.2 percent of theory) of diperfluoroalkyl-ethylfumaric acid ester. Boiling point: 71°-174°C (0.005 Torr).

Analysis: calculated for

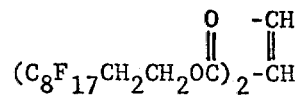

C, 28,6%, H, 1,0%, F, 64,10%; found C, 27,4%, H, 1,2%, F, 62,9 %.

EXAMPLE 2 a. 150 g (0.34 mole) of perfluoroalkyl ethylnitrate *) and 24 g of acrylic acid (0.33 mole) are dissolved in 450 ml of toluene. Then 0.5 g of hydroquinone monomethyl ether and 10 ml of concentrated sulphuric acid are added. The reaction solution is kept for 18 hours at 110°C with stirring.

As the reaction solution cools a heavier phase is formed which is isolated at about 80°C. It is water-soluble and is discarded. The organic phase is then filtered at 80°C over a glass frit and the solvent is distilled off. 163 g of crude product are distilled in a high vacuum. The first runnings contain toluene and nitrotoluene.

Yield: 136.2 g (89.5 percent of theory) of perfluoroalkylethylacrylate. Boiling point: 74°-152°C/0.005 Torr.
Analysis: calculated for $C_8F_{17}CH_2CH_2OOCCH=CH_2$ C, 30,10%; H, 1,36%; F 62.40%; found C, 29,2%; H, 1,3%; F 60,7%.

No esterification takes place if the experiment is repeated by using concentrated nitric acid instead of concentrated sulphuric acid. 90 percent of the starting material is recovered.

b. The perfluoroalkyl ethylnitrate and acrylic acid according to a) are reacted under the following conditions and the following results are obtained:

| | 1 | 2 | 3 | 4 |
|---|---|---|---|---|
| solvent | benzene | xylene | toluene | methylcyclohexane |
| temperature (°C) | 50 | 50 | 50 | 30 |
| reaction time (in hours) | 2 | 2 | 2 | 12 |
| yield (%) | 78,0 | 31,8 | 72,6 | 62,6 |
| Analysis | C 29,6 | C 29,3 | C 29,9 | C 26,0 |
| | H 1,2 | H 1,3 | H 1,2 | H 1,1 |
| | F 63,9 | F 61,8 | F 61,7 | F 64,4 |

The boiling point of the resulting products corresponds to the range indicated under a).

EXAMPLE 3

140.5 g (0.27 mole) of perfluoroalkyl isopropylnitrate **) and 21 g (0.30 mole) of acrylic acid are dissolved in 500 ml of toluene.. Then 0.5 g of hydroquinone monomethyl ether and 15 ml of concentrated sulphuric acid are added. The reaction solution is kept for 18 hours at 110°C and then processed as described in Example 2.
Yield: 124.5 g (87 percent of theory) of perfluoroalkyl isopropylacrylic ester.
Boiling point: 44°–58°C/0.02 Torr.
Analysis: calculated for

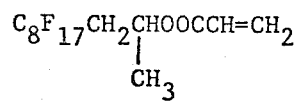

C, 31,60%; H, 1,70%; F 60,80%; found: C, 30,1%; H, 1,55%; F 59,6%.

EXAMPLE 4 a. 50.9 g (0.1 mole) of perfluoroalkyl ethylnitrate *) are dissolved in 100 ml of toluene. To this solution are added at room temperature within 10 minutes 10 g of concentrated sulphuric acid. The temperature is then raised to 80°C and the reaction mixture is kept for 8 hours at this temperature. After the reaction mixture has cooled a lower solid phase is filtered off, washed with toluene, and then distilled in a high vacuum.
Yield: 39.2 g (72 percent of theory) of a perfluoroalkyl ethyltoluenesulphonic acid ester.
Analysis: calculated for

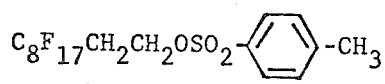

| | S 5,17 |
|---|---|
| found | S 5,12 |

Mass spectrum:
| calculated | $M_1$ | 518 | $M_2$ | 618 | $M_3$ | 718 | (molecular peak) |
| found | $M_1$ | 518 | $M_2$ | 618 | $M_3$ | 718 | |

NMR (100 Mc)
6,1 + 6,2 ppm  
6,42 + 6,52 ppm   (aromatic hydrogen atoms)

b. 37.0 g (0.06 mole) of perfluoroalkyl ethyltoluenesulphonic acid ester are dissolved in 120 ml of toluene and the solution is treated with 1 ml of concentrated sulphuric acid and 4.7 g (0.06 mole) of acrylic acid. The esterification is carried out over 12 hours at 110°C. After the solution has cooled, p-toluenesulphonic acid precipitates as a colourless product and is filtered off. The filtrate is distilled.
Yield: 18.5 g (59.87 percent of theory) of perfluoroalkyl ethylacrylic ester.
Boiling point: 75°–165°C (0.005 Torr).
Analysis: calculated for $C_8F_{17}CH_2CH_2OOCCH=CH_2$: C, 30,10%; H, 1,36%; F, 62,40%; found: C, 30,10%; H, 1,4 %; F 62,1 %.

EXAMPLE 5

The following components are reacted in accordance with Example 2: 21 g of the nitrate of the formula $$CF_3(CF_2)_n(CH_2CF_2)_oCH_2CH_2ONO_2$$
                                                    ***)

2.15 g of fumaric acid, 0.5 g of hydroquinone monomethyl ether, 2 ml of concentrated sulphuric acid 100 of toluene. Reaction conditions: 5 hours at 110°C.
Yield: 19.5 g (94.5 percent of theory).
A reaction product mixture of the formula

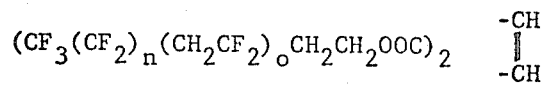

is obtained.

Boiling point range: 112° to 149°C - 0.05 Torr.
Mass spectrum:
| n = 5:5 | M = 936 | M (theoret.value): | 936 |
| n = 5:7 | M = 1036 | | 1036 |
| n = 7:7 | M = 1136 | | 1136 |

M - $OCH_2CH_2CH_2CF_2(CF_2)_nCF_3$ = 509 (n 5:5)
                                                              609 (n 5:7)
                                                              709 (n 7:7)

EXAMPLE 6

The following components are reacted in accordance with Example 2:
120 g of $CF_3(CF_2)_n(CH_2CF_2)_oCH_2CH_2ONO_2$   ***)
16 g of acrylic acid,
10 ml of concentrated sulphuric acid,
0.5 g of hydroquinone monomethyl ether,
450 ml of toluene.
Reaction conditions: 12 hours at 110°C.
Yield: 102 g (84 percent of theory).
During distillation in a high vacuum the ester partially decomposes.
boiling point range: 75° to 115°C - 0.005 Torr.
A reaction product mixture of the formula $$CF_3(CF_2)_n(CH_2CF_2)_oCH_2CH_2OOC\ CH=CH_2$$

is obtained.

Mass spectrum:
| n | o | M | M - HF | M(theor.value) |
|---|---|---|---|---|
| n = 5, | o = 1, | M = 482, | M - HF = 462 | 482 |
| n = 7, | o = 1, | M = 582, | M - HF = 562 | 582 |
| n = 9, | o = 1, | M = 682, | M - HF = 662 | 682 |
| n = 5, | o = 2, | M = 546, | M - HF = 526 | 546 |
| n = 7, | o = 2, | M = 646, | M - HF = 626 | 646 |
| n = 9, | o = 2, | M = 746, | M - HF = 726 | 746 |

EXAMPLE 7

The following components are reacted in accordance with Example 2:
60 g of nitrate of the formula $$CF_3(CF_2)_n(CH_2CF_2)_oCH_2CH_2ONO_2$$

\*\*\*)

9.6 g of methacrylic acid,
0.5 g of hydroquinone monomethyl ether,
5 ml of concentrated sulphuric acid,
240 ml of toluene.
Reaction conditions: 5 hours at 110°C.
Yield: 50.5 g (81.5 percent of theory).
A product of the formula $$CF_3(CF_2)_n(CH_2CF_2)_oCH_2CH_2OOCC(CH_3)=CH_2$$

is obtained.
Boiling range: 75°–97°C/0.05 Torr.

Mass spectrum:
| n = 5 | o = 1 | M = 496 | M (theoret. value) | 496 |
|---|---|---|---|---|
| n = 7 | o = 1 | M = 596 | | 596 |
| n = 9 | o = 1 | M = 696 | | 696 |
| n = 5 | o = 2 | M = 560 | | 560 |

EXAMPLE 8

The following components are reacted in accordance with Example 2:
30 g of nitrate of the formula $$CF_3(CF_2)_n(CH_2CF_2)_oCH_2CH_2ONO_2$$

\*\*\*)

4 g of itaconic acid,
0.5 g of hydroquinone monomethyl ether,
2 ml of concentrated sulphuric acid,
200 ml of toluene.
Reaction conditions: 5 hours at 110°C.
Yield: 23 g (78 percent of theory).
A pale yellow product mixture of the formula $$CF_3(CF_2)_n(CH_2CF_2)_oCH_2CH_2OOC)_2 - \underset{-CH_2}{\underset{|}{C}} = CH_2$$

is obtained.
Boiling range: 153°–190°C/0.05 Torr, with partial decomposition.

Mass spectrum:
| n = 5 : 5 | M = 950 | M (theoret. value) | M = 950 |
|---|---|---|---|
| n = 5 : 7 | M = 1050 | | 1050 |
| n = 7 : 7 | M = 1150 | | 1150 |

EXAMPLE 9

The following components are reacted according to Example 2: 175 g of nitrate of the formula $$CF_3(CF_2)_nCH_2CHFCH_2CH_2ONO_2$$

\*\*\*\*)

25.0 g of acrylic acid,
0.5 g of hydroquinone monomethyl ether,
5 ml of concentrated sulphur acid,
600 ml of toluene.
Reaction conditions: 5 hours at 110°C.
Yield: 149 g (83.6 percent of theory).
A product of the formula $$CF_3(CF_2)_nCH_2CHFCH_2CH_2OOCCH=CH_2$$

is obtained.
Boiling range: 95° to 165°C/0.05 Torr.

Mass spectrum
| n = 5 | M = 464 | M (theoret. value) | M = 464 |
|---|---|---|---|
| n = 7 | M = 564 | | M = 564 |
| n = 9 | M = 664 | | M = 664 |

\*)
Composition of the perfluoroalkyl nitrate mixture:
23,75 % $C_6F_{13}CH_2ONO_2$  The ultimate analyses for
46,61% $C_8F_{17}CH_2CH_2ONO_2$  \*) and \*\*)
24,68% $C_{10}F_{21}CH_2CH_2ONO_2$  were always calculated on
Also $C_{12}F_{25}CH_2CH_2ONO_2$ and impurities  $R_f = C_8F_{17}$.

\*\*)

24,22%  $C_6F_{13}CH_2-\underset{CH_3}{\underset{|}{CH}}-ONO_2$ 45,82%  $C_8F_{17}CH_2-\underset{CH_3}{\underset{|}{CH}}-ONO_2$ 24,3 %  $C_{10}F_{21}CH_2-\underset{CH_3}{\underset{|}{CH}}-ONO_2$ Also  $C_{12}F_{25}CH_2-\underset{CH_3}{\underset{|}{CH}}-ONO_2$ and impurities \*\*\*)
$CF_3(CF_2)_n(CH_2CF_2)_oCH_2CH_2ONO_2$
| n = 5 | o = 1 | 24,0% |
| n = 7 | o = 1 | 38,0% |
| n = 9 | o = 1 | 26,0% |
| n = 5–9 | o = 2 | 8 % |

Remainder impurities.
\*\*\*\*)
| $CF_3(CF_2)_5CH_2CHFCH_2CH_2ONO_2$ | 22,0% |
| $CF_3(CF_2)_7CH_2CHFCH_2CH_2ONO_2$ | 48,0% |
| $CF_3(CF_2)_9CH_2CHFCH_2CH_2ONO_2$ | 21,5% |

Also $CF_3(CF_2)_{11}CH_2CHFCH_2CH_2ONO_2$ and impurities.

I claim:
1. A process for the manufacture of perfluoroalkyl esters of the formula

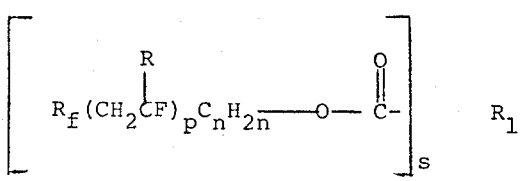

wherein $R_f$ represents an unbranched or branched perfluoroalkyl radical with 4 to 14 carbon atoms, R represents hydrogen or fluorine, $R_1$ represents an ethylenically unsaturated hydrocarbon radical of organic monobasic, dibasic, or tribasic carboxylic acids with 3 to 6 carbon atoms, n is a whole number from 1 to 12, p is 0 or a whole number from 1 to 3, and s is a whole number from 1 to 3, which process comprises reacting at temperatures of from 30° to 150°C a perfluoroalkyl nitrate of the formula

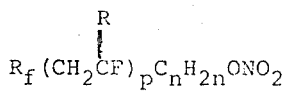

with an organic carboxylic acid of the formula $R_1(COOH)_s$ in an organic solvent selected from the group consisting of benzene, toluene, xylene, cyclohexane and methylcyclohexane and in the presence of concentrated sulphuric acid, the molar ratio of the perfluoroalkylnitrate to the concentrated sulphuric acid being about 0.01 to 1:1.

2. A process according to claim 1 for the manufacture of perfluoroalkyl esters of the formula

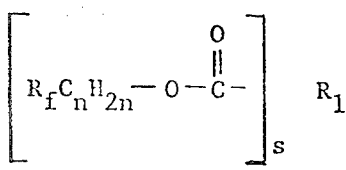

wherein $R_f$ represents an unbranched or branched perfluoroalkyl radical with 4 to 14 carbon atoms, $R_1$ represents an ethylenically unsaturated hydrocarbon radical of organic monobasic, dibasic, or tribasic carboxylic acids with 3 to 6 carbon atoms, n is a whole number from 1 to 12 and s is a whole number from 1 to 3, which process comprises reacting a perfluoroalkyl nitrate of the formula $R_fC_nH_{2n}ONO_2$ with an organic carboxylic acid of the formula $R_1(COOH)_s$ 3. A process according to claim 1, wherein said perfluoroalkyl nitrate is reacted with said sulphuric acid and subsequently, optionally after isolation of the resulting intermediate product, with said organic carboxylic acid.

4. A process according to claim 3, wherein the reaction with the organic carboxylic acid is performed without isolation of the resulting intermediate product.

5. A process according to claim 1, wherein a perfluoroalkyl nitrate of the formula

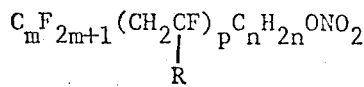

is used, wherein m is a whole number from 4 to 12, n is a whole number from 1 to 12, preferably from 2 to 6, and p is 0 or a whole number from 1 to 3, and R is hydrogen or fluorine.

6. A process according to claim 5, wherein m is a whole number from 4 to 10, n is a whole number from 1 to 3, and p is 0 or 1.

7. A process according to claim 5, wherein a perfluoroalkyl nitrate of the formula $C_mF_{2m+1}C_nH_{2n}ONO_2$ is used, wherein m is a whole number from 4 to 12 and n is a whole number from 1 to 12.

8. A process according to claim 7, wherein m is a whole number from 4 to 10, and n is a whole number from 1 to 3.

9. A process according to claim 5, wherein a perfluoroalkyl nitrate of the formula

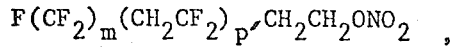

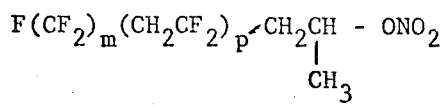

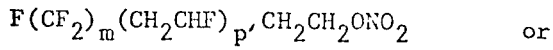

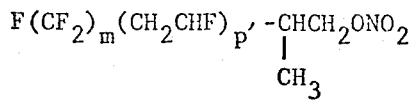

is used, wherein m is a whole number from 4 to 12, and p' is a whole number from 1 to 3.

10. A process according to claim 5, wherein a perfluoroalkyl nitrate of the formula $F(CF_2)_mCH_2CH_2ONO_2$ or

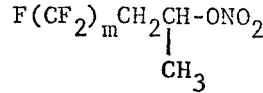

is used, wherein m is a whole number from 4 to 12.

11. A process according to claim 5, wherein a perfluoroalkyl nitrate of the formula $F(CF_2)_mCH_2CF_2CH_2CH_2ONO_2$ or

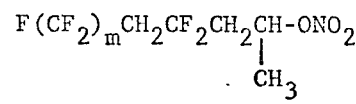

is used, wherein m is a whole number from 4 to 12.

12. A process according to claim 5, wherein a perfluoroalkyl nitrate of the formula $F(CF_2)_mCH_2CHF\ CH_2CH_2ONO_2$ or

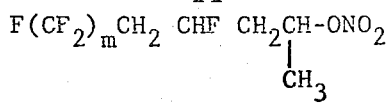

is used, wherein m is a whole number from 4 to 12.

13. A process according to claim 1, wherein as said organic carboxylic acid there is used acrylic acid, methacrylic acid, crotonic acid, vinylacetic acid, fumaric acid, maleic acid, methylenemalonic acid, citraconic acid, mesaconic acid, itaconic acid, or aconitic acid.

14. A process according to claim 13, wherein said organic carboxylic acid is acrylic, methacrylic, fumaric, or itaconic acid.

15. A process according to claim 1, wherein the reaction is carried out at temperatures of 90° to 120°C.

16. A process according to claim 1, wherein the molar ratio of perfluoroalkyl nitrate to carboxylic acid is 2:1 to 1:2.

17. A process according to claim 7, wherein n is a whole number from 2 to 6.

18. A process according to claim 9, wherein m is a whole number from 4 to 10.

19. A process according to claim 10, wherein m is a whole number from 4 to 10.

20. A process according to claim 11, wherein m is a whole number from 4 to 10.

21. A process according to claim 12, wherein m is a whole number from 4 to 10.

* * * * *